United States Patent [19]

Berger

[11] 3,843,965

[45] Oct. 22, 1974

[54] MAGNETICALLY RECORDED CLOCK READING CIRCUIT

[75] Inventor: James K. Berger, Sherman Oaks, Calif.

[73] Assignee: Computer Design Corporation, Los Angeles, Calif.

[22] Filed: May 24, 1973

[21] Appl. No.: 363,358

[52] U.S. Cl. .................................................. 360/51
[51] Int. Cl. ............................................. G11b 5/44
[58] Field of Search ................................. 360/46, 51

[56] References Cited

OTHER PUBLICATIONS

"Pulse & Digital Circuits," by Millman & Taub, McGraw Hill Book Co., 1956 ed.

*Primary Examiner*—Vincent P. Canney
*Attorney, Agent, or Firm*—Lindenberg, Freilich, Wasserman, Rosen & Fernandez

[57] ABSTRACT

A circuit is provided which eliminates the distortion which occurs when magnetically recorded signals are read at the beginning of a track. The circuit is connected to the output of an amplifier connected to the magnetic reading head and serves to prevent the first read signals from being so one sided (with respect to a base line) as to cause the following reading circuit to lose pulses.

5 Claims, 2 Drawing Figures

MAGNETICALLY RECORDED CLOCK READING CIRCUIT

BACKGROUND OF THE INVENTION

This invention relates to circuits for reading magnetically recorded signals, and more particularly, to improvements therein.

When a reading circuit commences to read signals from a magnetically recorded track, at the outset, the reading circuits presently being used, because of the fact that the reading head is AC coupled to the remainder of the circuit, produce an output signal which contains a DC voltage component in addition to the desired signal, where the actual signal reproduced, for the first several cycles of the reading is distorted. Where the track being read contains clock signals, there may actually be a loss of the first several clock signals, with a consequent loss of data.

OBJECTS AND SUMMARY OF THE INVENTION

It is an object of this invention to provide a circuit which is connected to a magnetic track reading head, which prevents the production of a decaying DC component in the output signal, at the start of reading.

Yet another object of this invention is the provision of a novel and useful circuit which can faithfully reproduce signals read from a magnetic clock track.

The foregoing and other objects of the invention are achieved in an arrangement wherein the amplifier, to which the reading head is coupled, is connected to the input of the succeeding amplifier through a capacitor. Between that capacitor and the input to the succeeding amplifier, there is connected to ground, or a point of reference potential, a series circuit comprising a diode, and a second capacitor having a capacitance which may, for example, be equal to that of the first capacitor. In operation, the first signal, which is read as a negative going signal, is usually twice the amplitude of the signal which should be read. The diode conducts during this signal. Thereby, the first signal is applied to the two capacitors in series, with the result that only half of the signal is applied to the following amplifier. The following, positive going portion of the signal is reproduced with its full amplitude since the diode is connected with such a polarity that it does not conduct in the presence of a positive going signal. The diode does not conduct thereafter, since the second capacitor stores the voltage which it has received during the first negative signal, with a polarity such that the diode is blocked.

The novel features of the invention are set forth with particularity in the appended claims. The invention will best be understood from the following description when read in conjunction with the accompanying drawings.

DESCRIPTION OF THE PREFERRED EMBODIMENTS

One of the data storage devices which is presently employed is a magnetic card. A magnetic card will have recorded thereon several parallel data tracks and a clock track to enable proper data readout.

Figure 1:
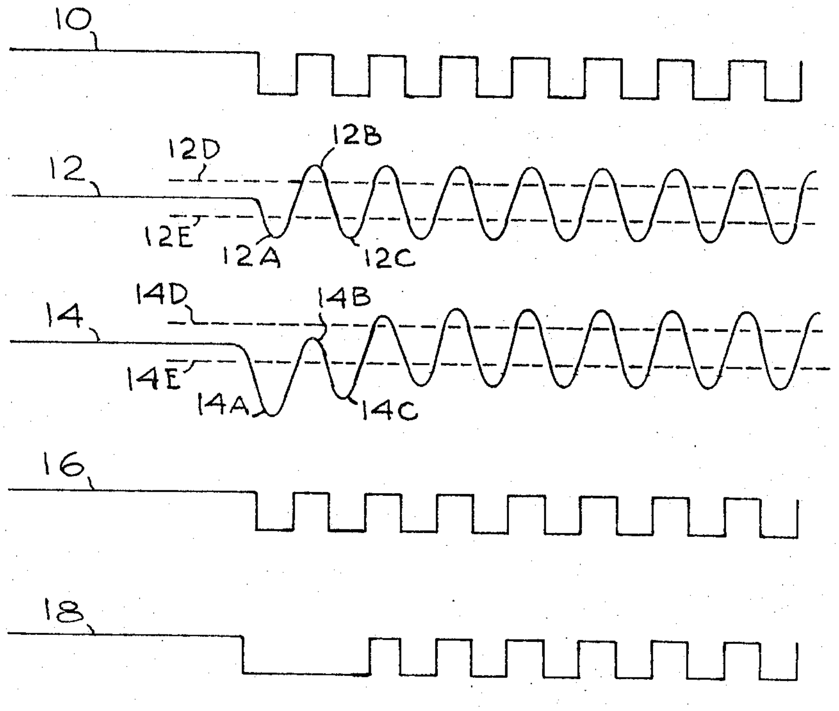
FIG. 1 is a wave-shape diagram shown to assist in an understanding of the invention.

Shown in FIG. 1, is a waveform 10, which represents flux variations which have been recorded for providing clock track signals, and the waveform 12 indicates the voltages desired when this clock track is read. It should be noted the recorded waveform 10 starts at a positive saturation level, which is at the beginning of the track and then goes negative to a negative saturation level, returning back to positive saturation thereafter and then negative again. The voltage desired to be read effectively is a differentiated signal of the waveform 10, but limited in bandwidth so as to resemble a sine wave, and as represented by the waveform 12, provides a negative going signal for the negative going edge of the recorded signal, and a positive going signal for the positive going edge of the recorded signal.

The situation that actually happens when the recorded clock track is read, is represented by the waveform 14, starting from the zero level signal, in response to the negative going edge of the first pulse, the output signal of the read amplifier has a negative going signal, 14A, which reaches approximately two times the amplitude of the desired signal. The positive going edge of the first recorded pulse, as represented by the waveform 14B, barely exceeds the zero level, and does not reach the positive threshold level of the following circuit. The next negative going edge which is read produces a negative going signal, 14C, which does not have nearly as large a negative going amplitude as 14A. Thereafter, the waveform 14 has practically recovered to the form represented by the desired waveform 12.

The waveform 14 is applied to processing circuits which convert it from the form shown to a squarewave pulse wavetrain, by switching the digital output in response to the signal crossing thresholds 14D and 14E. However, because of the fact that the first positive signal, which is read, as represented by 14B, does not exceed a positive threshold 14D, a clock pulse waveform such as is represented by the waveform 18 is produced. It will be seen here that effectively, the first two clock pulses are missing. This can lead to errors in the data being read.

Figure 2:
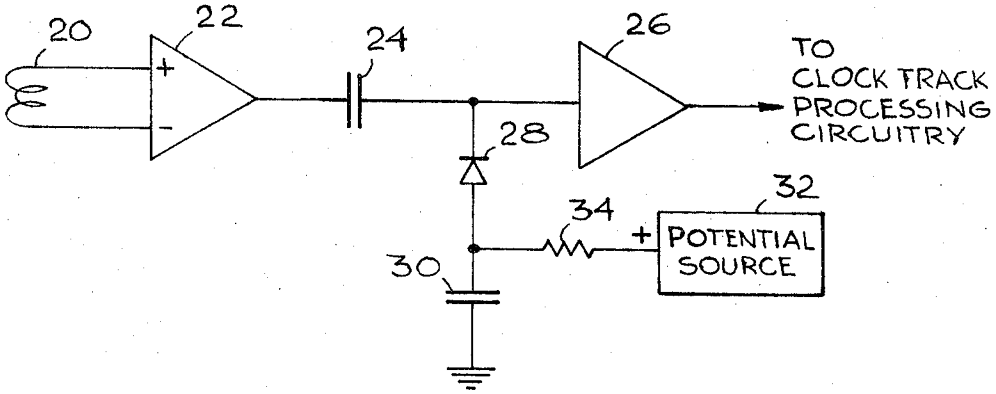
FIG. 2 is a schematic diagram illustrating the embodiment of the invention.

Referring now to FIG. 2, there may be seen a circuit arrangement, in accordance with this invention, which eliminates the problem depicted by the waveforms in FIG. 1. The read head 20, which is positioned over the track being read, is connected to a first amplifier 22. The output of the first amplifier is connected through a first capacitor 24, to the input of a second amplifier 26. A series circuit consisting of a diode 28, and a capacitor 30, are connected between ground and the input of the amplifier 26. A positive potential source 32, is connected through a resistor 34 to the junction between the diode and the capacitor.

The diode is poled so that its anode is connected to the capacitor, and its cathode is connected to the input to the amplifier 26. The value of the potential applied to the diode is such that it is biased just at the point of conduction. The output of the amplifier 26 is connected to the circuitry which processes the waveforms which have been read from the magnetic track by comparing them to a positive and a negative threshold. In this case, this would be circuits which convert the waveforms such as 12 to rectangular waveform 16, or from waveform 14 to waveform 18.

In operation, when the negative going waveform 14A is read by the read head, the diode 28 is enabled to conduct, because of the application of the negative going signal to its cathode. This effectively, places the two capacitors 24 and 30 in series, and therefore, the voltage applied by the output of amplifier 22 across the series connected capacitors, which are selected to have the same capacitance values, is divided by them so that the voltage which is applied to the input of amplifier 26, is half of the output voltage of amplifier 22. This half value is substantially the accurate value, and therefore input to amplifier 26 will resemble the signal 12A, or the desired first signal. Capacitor 30, at this time, is charged up to a voltage having the value of the negative peak of the signal 14 as it is after the starting effects are gone.

When the signal read by the read head begins to become positive going, diode 28 can no longer conduct in view of the negative signal present across capacitor 30. Therefore, it is blocked. Therefore, the full positive going value of the signal 14B is applied to the input to the amplifier 26. Therefore, the amplifier 26 will see a signal, such as 12B. This is the desired input signal for amplifier 26.

Since signal 14C is no more negative going than the signal already stored across capacitor 30, diode 28 remains blocked, and continues to stay blocked. However, by that time, the circuit has served its purpose, and the first two pulses in the wavetrain will be reproduced so that the wavetrain will resemble wavetrain 10. Between the readings of tracks, the charge on capacitor 30 is removed through resistor 34 to reset the circuit for the next start.

There has accordingly been shown and described herein, a novel and useful reading circuit for reading signals which have been magnetically recorded. It will be obvious to those skilled in the art that if the signals which have been recorded are such that they start from a negative saturation level and go positive, then the circuit arrangement shown in FIG. 2 is altered so that the diode is poled in reverse and has a negative bias applied to its cathode which biases the diode at the point of conduction.

It should also be noted that the operation of the circuit is independent of signal amplitude, and does not require adjustment to compensate for more or less efficient magnetic media, or wear of the reproduce head.

What is claimed is:

1. In a circuit for reading data which has been recorded on a magnetic medium, wherein the magnetic reading head applies its output to an amplifier, means for compensating for distortion which occurs at the commence of said reading comprising:

a first capacitor connected between said reading head and the input to said amplifier, a source of reference potential, a second capacitor having one terminal connected to said source of reference potential, and diode means connecting the other terminal of said second capacitor to the input to said amplifier, said diode means being poled to conduct in response to the leading edge of the first signal read by said reading head.

2. A circuit as recited in claim 1 wherein there is a pre-amplifier coupling said reading head to said capacitor.

3. A circuit as recited in claim 1 wherein there is provided potential means for biasing said diode to the point of conduction.

4. A circuit as recited in claim 1 wherein said first and second capacitors have substantially the same capacitance value.

5. In a circuit for reading data which has been recorded on a magnetic medium, wherein the magnetic reading head applies its output to a pre-amplifier, means for compensating for distortion which occurs at the commencement of said reading comprising:

a first and a second capacitor, diode means connecting said first and second capacitors in series, said diode means being poled to be conductive in response to the leading edge of the first signal read from said track, an amplifier, means connecting said amplifier input to the junction between said diode means and said first capacitor, means connecting the terminal of said first capacitor which is not connected to said diode means to the output of said pre-amplifier, and means connecting the terminal of said second capacitor which is not connected to said diode means to a point of reference potential.

* * * * *